July 23, 1929.  J. G. UTZ  1,721,890
BRAKING APPARATUS
Filed Feb. 6, 1925
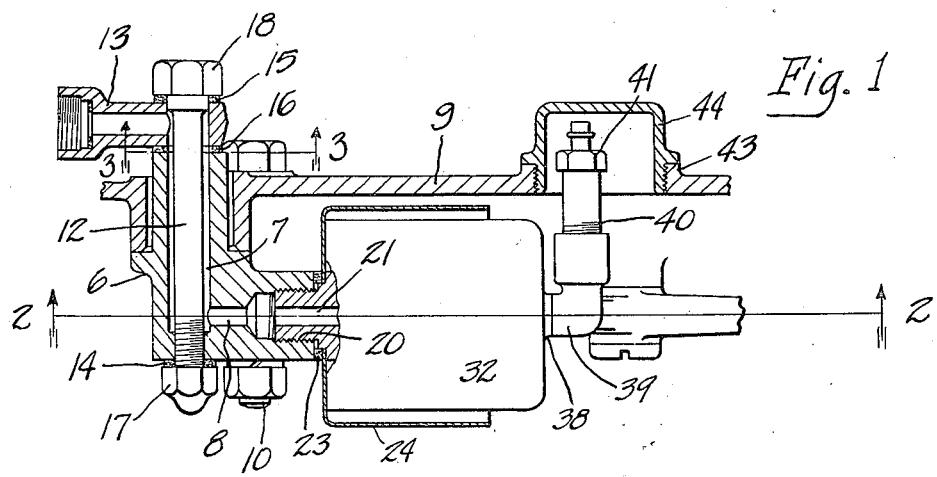
Fig. 1
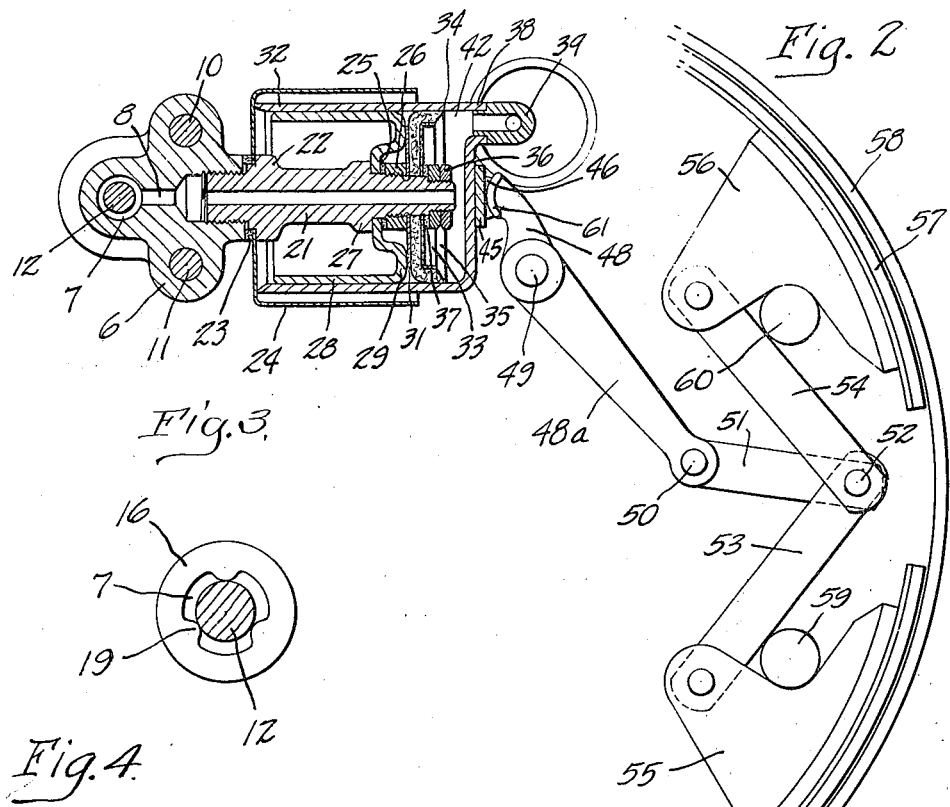
Fig. 2
Fig. 3
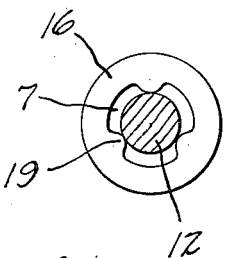
Fig. 4
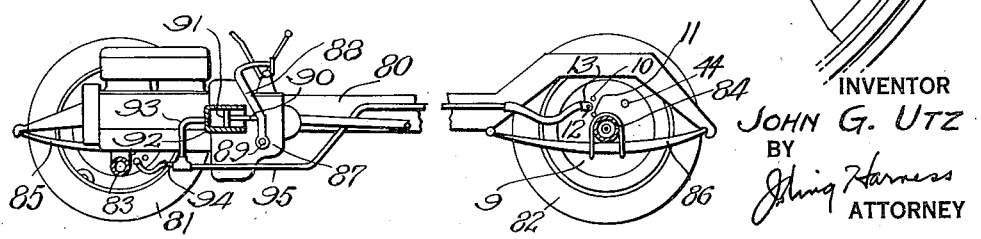
INVENTOR
JOHN G. UTZ
BY
ATTORNEY Patented July 23, 1929.

1,721,890

UNITED STATES PATENT OFFICE.

JOHN G. UTZ, OF DETROIT, MICHIGAN, ASSIGNOR OF ONE-THIRD TO ROBERT C. HUPP AND ONE-THIRD TO J. KING HARNESS, OF DETROIT, MICHIGAN.

BRAKING APPARATUS.

Application filed February 6, 1925. Serial No. 7,426.

In the modern motor car brakes, both external and internal, one of the greatest difficulties encountered is that of equalization between the various brakes on a vehicle, whether that be two or four.

The strife has been to have the braking effort such that one wheel will not lock before the other, or others, and this condition becomes extremely difficult with the recently popular four-wheel brakes.

It is the common practice to supply adjustment whereby compensation can be had for wear of brake linings and the brakes re-equalized when such wear occurs. All brakes are operated by some mechanism of levers and links, whereby the pressure between the brake shoe and the brake drum is applied whether the actuating mechanism is "mechanical" or "hydraulic". Equalization of the actuating means is not so very difficult, although fluid or hydraulic actuating means seems to present a better solution because the law of hydraulics assists in applying equal hydraulic pressure per square inch to the wheel cylinders, and if the wheel cylinders are squal in areas, the total pressure applied will be equal. From this point on, however, to the friction creating means between the band and the drum or the shoe and the drum, complications arise, inasmuch as the various mechanisms employed change their virtual lever arm lengths, during their operation cycle, so that unequal shoe-drum pressures occur when the mechanisms are in different positions. These different positions are usually brought about by lining wear, as it is practically impossible to insure, or guarantee, uniform wear, and in the case of the four-wheel brakes, it is possible to have four different conditions of lining wear. To depend upon human means to skilfully operate the different adjustments, introduces the well-known human error, and exact equalization of the shoe-drum pressures is well nigh impossible.

It is the primary object of my invention to provide a braking mechanism suitable for use on a vehicle such as an automobile, whereby the brakes may be set in operation and caused to automatically equalize.

A further object is to, as nearly as possible, build the entire structure of sheet metal or stampings, which not only cuts down the cost of production, but also has certain definite operating advantages.

A further object of my invention is to provide a device that is easily assembled and disassembled so that in case of wear or breakage, new parts can be supplied without extreme trouble.

I have shown my improved construction as consisting of a single movable sheet metal cylinder operating in conjunction with a single fixed sheet metal piston to cause the operation of the brake on each wheel, and have provided fixed stops for the movable cylinder of unique and efficient design.

With the above, and other objects, in view, my invention consists in the arrangement, combination and construction of the various parts of my improved device as described in the specification, claimed in my claims and shown in the accompanying drawings, in which:

Fig. 1 is a top or plan view of my improved device, with certain parts shown in section.

Fig. 2 is a sectional view taken on line 2—2 of Fig. 1.

Fig. 3 is a sectional view taken on line 3—3 of Fig. 1.

Fig. 4 is a longitudinal section of the vehicle chassis showing my invention applied thereto.

In the device to which my invention is to be applied I have shown a vehicle frame 80, road wheels 81 and 82, axles 83 and 84, a spring 85 connecting the axle 83 to the frame and a spring 86 connecting the axle 84 to the frame. Conventionally mounted on the side of the transmission case 87 of the vehicle is a brake pedal 88 pivoted at 89 and attached to the rod 90 for moving the piston 91 in the cylinder 92. The cylinder 92 is connected by a conduit 93 to the conduits 94 and 95 leading to the brake mechanism on the front and rear wheels, respectively.

I have shown a forging 6, that has the connected conduits 7 and 8 therein, secured to the plate 9 by the bolt 10 and 11. A bolt 12 is utilized for securing the conduit 13 to the conduit 7, the shank of the bolt 12 extending through the conduit 7. Metallic washers 14, 15 and 16 are placed between the nut 17 on the bolt 12 and the forging 6, as well as between the forging 6 and the head 18 of the bolt 12, and between the forging 6 and the conduit 13 and between the passage 7 and the passage 13, so as to prevent leakage at the connections of the two passages and at the point where the bolt 12 extend from the forging 6. The washer 16, which is placed between the two conduits is provided with ears 19 which engage and center upon the shank of the bolt 12, while the intermediate spaces between the ears 19 permit the passage of fluid into and through the conduit.

The conduit 8 is screw-threaded as at 20 and another conduit 21, with a shoulder 22 thereon, is screwed therein so that a metallic washer 23 and the sheet metal shield 24 are made secure between the forging 6 and the shoulder 22.

Secured to the conduit 21 by means of the washer 25, the nut 26 and the shoulder 27, is a fixed sheet metal piston 28. Positioned around the conduit 21 is the sheet metal piston head disk 31 that rests on the nut 26 and the raised top portion 29 of the piston 28. Fitted for reciprocation over the skirt of the piston 28 is the movable sheet metal cylinder 32.

A cup of rubber or any other suitable material 33 is placed around the conduit 21 so that its outer edges bear against the inner face of the cylinder 32, as at 34, and the said edges are so formed and positioned that pressure of the fluid will cause it to bear against the side walls of the cylinder. The free end of the cup 33 is chamfered as at 35, so as to scrape the fluid from the wall of the cylinder 32 on the return movement thereof and direct it inwardly toward the mouth of the conduit 21. A pair of nuts 36 are secured on the screw-threaded end of the conduit 21, a washer 37 being positioned between them and the cup 33 so that when the nuts are screwed home and locked in position, an effective seal against leakage of fluid around the edges of the cup 33 where they engage the conduit 21, is had.

Secured to the flanged opening 38 on top of the cylinder 32 is the bleeder mechanism which consists of the elbow conduit 39, the combination plug and conduit 40 screwed therein. The conduit 39 may be welded to the end of the flanged opening 38. When the conduit or plug 40 is loosened, by turning the integral hexagon portion 41, fluid may pass from the chamber 42 in the end of the cylinder, through the conduit 39 and the conduit 40 to the air. Access to the bleeder mechanism cap is provided by placing a boss 43 in the plate 9, said boss having a screw-threaded opening therein, into which a cap 44 may be threaded, or otherwise attached to cover the opening.

The end of the movable cylinder 32 has welded thereon a disk 45 that has a pair of separated ears 46, between which the end of a lever 48 extends.

Thus, in the practical operation of my improved device up to this point, fluid under pressure will pass from the conventional source of supply through the conduits 13, 7, 8 and 21, into the chamber 42, formed by the cup 29 on the conduit 19, and the end of the cylinder 32. The pressure of the fluid will then force the cylinder 28 forward with the result that the lever 44 that actuates the brakes will be set into motion. When the fluid pressure has been released, the cylinder 32 is returned to its original position by the aid of the forces acting upon the lever 48.

It will be noted that the return movement of the cylinder is stopped when the free end thereof strikes the shield 24.

The lever 48 is pivoted to the plate 9 as at 49, so that the lower portion of the arm, designated as 48$^a$, which is connected at 50 to the link 51, may move the said link. Connected to the opposite end of the link 51, as at 52, are a pair of links 53 and 54, to which are respectively connected shoes 55 and 56. The shoes 55 and 56 are connected each to one end of the brake band 57, which band is adapted to contact with the inner face of the brake drum 58. Anchor pins 59 and 60 are provided for the shoes 55 and 56, respectively.

Thus it follows that outward movement of the cylinder 32, the lever 48—48$^a$ will move about its fulcrum point 49, drawing the link 51 and the connecting portions of the links 53 and 54 inwardly and causing the shoes 55 and 56 to force contact of the band 57 with the drum 58. The rotation of the drum 58 will tend to cause rotation of the band 57 in the same direction, with the result that one of the shoes will come to a fixed stop on its anchor pin and the other will move slightly away from its anchor pin (depending upon the direction of rotation) so as to produce the so-called "wrapping" effect.

If all of the bands are of equal thickness, the braking effect thus produced will be equal upon all of the brakes on the vehicle (with the exception of variations due to varying coefficients of friction in the various linings) but if unequal wear has taken place in the linings, or if, for any other reason, the linings are of different thicknesses, the braking effect would not ordinarily be equal for the reason greater pressures would be applied upon the shoes wherein the lining was thin than in those wherein the lining was thick because of the greater travel of the link 51 inwardly.

The links 53 and 54 joined by the pin 52 form a toggle and the pressures transferred by this toggle to the shoes 55 and 56 bear a definite relation to the force applied at the pin 52 by the link 51 when the link 51 is operated by the arm 48—48$^a$ swinging on its fulcrum 49. This toggle functions according to the well known formula $$\frac{R}{P} = \frac{\cos a}{2 \sin a},$$

where P is the pressure applied to the pin 52, R is the resulting brake applying pressure transferred to each shoe 55 and 56 and the angle "a" is the angle between either link 53—54 and a line drawn through the points of attachment of the links 53—54 to the shoes 55—56. From this formula it will be noted that as the angle "a" decreases and the links 53—54 approach a straight line the ratio of the pressure R to the applied force P will increase until the angle "a" becomes zero where the force R becomes infinite. When the angle "a" has a value of approximately 26½°, the $\frac{R}{P}$ ratio becomes unity and the resultant pressure R is equal to the applied pressure P. By choosing dimensions that will bring the angle "a" in the neighborhood of 26½° and so designing the parts that the operating functions will occur nearby this angle, the forces will not depart far from the condition where the R and P will be approximately equal, and since the formula recited is quite definite, calculation of the forces is simple. It should also be noted that the movement of separation of the shoes 55—56 is quite rapid when the angle "a" is great and this same relative motion reduces as the angle "a" decreases. This peculiarity permits the shoes 55—56 to be held an appreciable distance away from the brake drum when the brake is not in action, which original clearance can be taken up quite rapidly and the shoes brought quickly into operative contact with a very small movement of the link 51, a condition that is ideal for the functions desired.

It will next be noted that as the lever 48ª swings down in operation (thus pulling on the link 51 and reducing the toggle angle "a"), its virtual lever arm is increasing. Its first movement takes up the clearance between the shoes and the drum and when contact has been establishd, comes to rest. This position gives a certain virtual lever arm 48ª and a certain toggle angle "a", both of which are easily measured or calculated. Now, portion 48 of this balance lever also has a varying virtual lever arm which is the distance between the center of the pin 49 and the contact point of the cam face 61 and the disk 45 measured at right angles to the axis of the cylinder 32. Since the rate of change of the virtual lever arm of the lever 48 depends on the shape of the cam face 61, it becomes a matter of simple design to construct a cam face 61 that will decrease the virtual lever arm of the lever 48 at a rate that will exactly offset the gain in lever arm of 48ª, as well as compensate for the gain in the force R as the toggle linke 53—54 are straightened out as the lining wears bringing about a new arrangement of the various parts.

It necessarily follows that as the lining wears and new positions of the parts occur, the relation of the pressure of the lining on the brake drum is definitely fixed by the shape of the cam face 61. Also it will be clear that as the lining wears and its thickness is reduced, the cylinder 32 will have moved out further on its stroke. With a constant hydrostatic pressure between the cylinder 32 and the piston 28, the resultant pressure between lining and drum will remain constant, thus accomplishing the object of my invention, because with a constant hydrostatic pressure in all cylinders of a series of brakes made alike and according to my invention, the shoe drum pressures in all wheels will be the same regardless of the thickness of the various linings."

Thus, it will be seen that equality of braking pressures on the drum will be automatically effected irrespective of the wear condition of the linings.

While I have here shown but one operating brake, it is believed that I have made my invention clear as applicable to several brakes of the same design.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a plurality of separate brake drums, friction members for each of said drums, levers adapted to exert equalized pressure on said drums through said friction members, said levers being mounted directly adjacent said brake drums, means for actuating said levers, said means and levers including mechanism for maintaining the pressure applied to said friction members constant under varying conditions of wear of the friction members on the various drums.

2. In combination, a plurality of brake drums, friction members for each of said drums, levers mounted directly adjacent said drums and adapted to exert pressure on said drums, fluid means for applying equalized pressure on said levers for operating them, and means interposed between said fluid means and said levers for automatically applying equalized pressure on said friction members against said drums under varying conditions of wear of the friction members on the various drums.

3. In combination, a plurality of brake drums, friction members for each of said drums, levers mounted directly adjacent said drums and adapted to exert pressure on said drums, fluid operated means for exerting pressure upon said levers to operate the same, contact between said levers and said fluid means being established by a cam surface, shaped so that movement of the lever will tend to change its virtual lever arm so that greater movement of one arm than another will be compensated for to the extent that the pressure applied by said friction members to said drums may remain constant.

4. In combination, a brake drum, a friction member for said drum, a pair of links for said friction member, each having one end joined to said member at different points thereon, the other ends of said links being joined together, an operating lever connected with said latter ends and pivoted to move said links in the form of a toggle, hydraulically operated means for actuating said levers, contact between said means and said lever being of cam shape, whereby movement of said means will exert substantially uniform pressure on the drums thru the friction members.

5. In combination, a plurality of separated brake drums, friction members for each of said drums, means for exerting equalized pressure through said friction members against said drums, said means including mechanism for maintaining equalized leverage on the drums through the friction members throughout the wear of said friction members.

JOHN G. UTZ.